United States Patent Office 3,306,942
Patented Feb. 28, 1967

3,306,942
DEHYDROGENATION CATALYST AND PROCESS
Emerson H. Lee, Texas City, Tex., assignor to Monsanto Company, a corporation of Delaware
No Drawing. Filed Aug. 15, 1963, Ser. No. 302,473
7 Claims. (Cl. 260—669)

The present invention relates to the dehydrogenation of organic compounds. More particularly, it relates to an improved process for the dehydrogenation of alkyl aromatic hydrocarbons such as ethylbenzene to vinyl aromatic hydrocarbons such as styrene and to an improved iron oxide catalyst therefor.

In view of its utility in the production of plastics, styrene has achieved considerable industrial importance. It can be polymerized with various comonomers to produce a variety of synthetic rubbers and to yield resins which are suitable for manufacturing numerous articles of commerce by casting, compressing, molding, and the like. Besides being useful with other polymerizable materials, styrene can be homopolymerized to produce polystyrene, one of the most widely used synthetic resins.

It is well known that styrene is produced commercially by the catalytic dehydrogenation of ethylbenzene. The process is usually carried out by passing ethylbenzene and a relatively large proportion of steam, for example, 2–30 mols of steam per mol of hydrocarbon, over a bed of a suitable catalyst at elevated temperatures. The catalysts used in the process usually contain as a primary active constituent certain metals of Groups IV to VIII of the periodic table either in their free form or, preferably, in the form of various of their compounds such as the oxides, sulfides, phosphates, etc. Generally, mixtures of two, three, or more of such compounds are employed. Some of these catalysts, however, are characterized by certain disadvantages such as low conversion and/or selectivity of reaction, poor physical strength, short catalyst life, and necessity for frequent regeneration. Typical catalysts which have been found to have a minimum of these disadvantages are alkalized iron oxide catalysts wherein an alkali metal or alkaline earth metal compound is employed as a promoter, said promoter being usually a compound of potassium. These catalysts are autoregenerative under conditions at which the dehydrogenation reaction is effected, that is, they are capable of being continually regenerated under the conditions of the reaction. This obviates the necessity for interrupting the process and regenerating the catalyst, a procedure which includes burning the carbon deposits off the surface of the catalyst particles, as is required with other dehydrogenation catalysts. While these catalysts are generally suitable and widely used because of the above-mentioned advantages as they are currently employed in the art, they do not provide for maximum activity and/or maximum mol percent selectivity of reaction.

In the catalytic dehydrogenation process, both toluene and benzene are produced simultaneously with styrene. The production of benzene poses no particular problem since this compound can be readily recycled in most commercial plants because in the usual processes for preparing the ethylbenzene, benzene is alkylated either with ethylene, an alkyl chloride, or an alcohol. Toluene, however, is not reusable in the overall styrene process. It is simply a by-product and, depending upon prevailing market conditions, may prove to be a costly one. Any change in the composition or manner of preparing the catalyst which may result in a decrease in its selectivity to toluene in the reaction at various conversion rates and reduce production of this by-product to a minimum can be extremely significant economically and is, therefore, highly advantageous.

It is an object of the present invention, therefore, to provide an improved process for dehydrogenation of alkyl aromatic hydrocarbons such as ethylbenzene to vinyl aromatic hydrocarbons such as styrene. More specifically, it is an object of the present invention to control the process for dehydrogenation of ethylbenzene to styrene so that the least possible amount of toluene will be produced while the maximum yield of styrene is being attained. These and other objects of the invention which will become apparent from the following description and appended claims are accomplished by the use of an iron oxide catalyst containing an alkali promoter which is a compound of an alkali metal or an alkaline earth metal and a minor amount of chemically combined chlorine. The chlorine is generally incorporated in the catalyst composition in the form of the chloride of the metal corresponding to that in the alkali promoter although it can be produced in situ by treatment of the mixture of metallic compounds comprising the catalyst with chlorine or HCl. In the preferred embodiment of the invention, the novel catalyst is a formulation comprising iron oxide as the active catalytic agent promoted with potassium oxide, potassium carbonate, or a potassium compound other than the chloride which is convertible at least in part under reaction conditions to the oxide or the carbonate, and a minor amount of potassium chloride. Other compounds may be present in addition to these three essential ingredients such as stabilizers, diluents, binders, and the like.

The catalyst of this invention contains iron oxide as the predominating active dehydrogenating constituent. A convenient and economical source of iron oxide is in the form of commercial pigments which are of uniform purity and particle size. However, iron oxides may also be prepared by the thermal decomposition of iron compounds such as ferric nitrate, ferric oxalate, and the like or by precipitation from solutions of iron salts such as ferric nitrate, ferrous sulfate, etc., followed by thermal decomposition. Generally, however, the latter procedures do not produce an oxide of uniform characteristics and high purity at a cost competitive with that of commercial pigments. The concentration of the iron oxide in the finished catalyst may vary over a wide range. The catalyst should contain on a finished basis at least about 35% by weight of iron oxide. Preferably, the concentration of iron oxide is maintained in the range from about 45% to about 95% by weight.

An alkali promoter is also an essential constituent of the catalyst. Compounds of the alkali metals and the alkaline earth metals such as the oxides or compounds convertible at least in part under dehydrogenation conditions to the oxides such as the hydroxides, the carbonates, the bicarbonates, the phosphates, the borates, the acetates, and the like are useful as promoters. Of the alkali metal compounds, potassium compounds are preferred. Cesium and rubidium compounds are suitable but are generally not used because of their high cost. While the sodium compounds are less expensive than those of potassium, the latter are considered to be superior as promoters. A particularly preferred promoter is potassium carbonate. The amount of promoter in the catalyst may vary from about 0.5% by weight of the catalyst up to about 50% by weight or more. Preferably, the alkali metal promoter is incorporated in the catalyst in amounts from about 5% to about 35% by weight. Compounds of the alkaline earths, i.e., calcium, strontium, barium, and magnesium, may likewise be utilized as promoters. These are generally less effective than the alkali metal compounds and are usually employed only in conjunction with the latter. When they are utiliztd, their maximum concentration is about 10% by weight and amounts from about 1% to about 5% are preferrd. An especially effective promoter is a composite one containing a potassium compound and a compound of a metal chosen from the group consisting of sodium, lithium, barium, magnesium, and calcium wherein the potassium compound constitutes at least 1% by weight of the total catalyst composition and the weight ratio of the second metal compound to the potassium compound is maintained within the range from about 1:1 to about 5:1 and preferably from about 1:1 to about 2:1.

The third essential constituent of the catalyst of the invention, i.e., chemically combined chlorine, is present in very minor proportions. Amounts of bound chlorine in the range from about 0.05% to about 2.5% by weight of the total catalyst composition are employed with amounts from about 0.1% to about 1% of chlorine being preferred. In fact, the amount of this constituent present is a critical factor in determining the selectivity of the catalyst. Generally, the chemically combined chlorine is incorporated in the catalyst during its preparation by admixing with the other catalyst constituents the chloride of the metal corresponding to the metal of the alkali promoter or to the metal of the major constituent of the alkali promoter in the event that a composite promoter is employed. This is the preferred method; however, hydrochloric acid which reacts readily at the temperatures used for calcining with one or more of the catalyst constituents to yield chlorides can be added to the catalyst mixture prior to calcination. Alternatively, the catalyst constituents can be thoroughly admixed, moistened with water and formed into a paste and then treated with chlorine gas to effect conversion of the required amount of one or more of the constituents to the chloride form. Thereafter, the moistened mass is extruded, formed into pellets and calcined.

As indicated above, other ingredients may be present or not, as desired, in the catalyst composition. Heavy metal oxides more difficulty reducible than iron oxide which function as stabilizers can be included, for example. These metal compounds may be incorporated per se in the catalyst or they may be formed therein during the catalyst preparation from primary compounds such as the hydroxides, carbonates, nitrates, and the like. The concentration of such stabilizers is not critical. Only small amounts are required. Chromium oxide is the preferred stabilizer and this compound is generally employed in amounts from about 1% to about 5% by weight. Diluent materials such as alumina, zirconia, beryllia, and asbestos can also be incorporated in the catalyst as can binding agents such as silicates, cement, kaolin, and the like which impart structural stability to the catalyst composition.

The method of preparation of the catalyst is not critical. For example, the separate components may be ball-milled or otherwise mixed with a small amount of water, formed into pellets and dried. Small amounts of extrusion aids may also be incorporated into the paste. For example, 0.1% to 0.2% of such materials as stearic acid, hydrogenated cottenseed oil, tannic acids, or tannins may be added to modify the rheological properties of the mixture to aid in extrusion into pellets. Catalysts may also be prepared by means of a coprecipitation of solutions of reagents wherein the precipitate is convertible to the desired components of the catalyst or by impregnating the iron oxides with the other components.

Also uncritical are the shape and size of the catalyst particles. For example, the catalyst may be in the form of pellets, powder, pills, tablets, spheres, saddles, etc. Symmetrical pellets of 1/50 inch to 3/4 inch in diameter and 1/16 inch to 1 inch in length are considered very satisfactory. It has been found that calcination of the iron oxide either prior to or subsequent to mixing with the other components for at least one hour and preferably for several hours at a temperature of 500° to 1050° C. and preferably from 600° to 900° C. is usually beneficial to the activity of the catalyst.

The dehydrogenation of ethylbenzene is carried out in the vapor phase at temperatures above about 580° C. and preferably between 600° C. and 700° C. Somewhat higher temperatures up to about 800° C. can be used but are generally less suitable. The dehydrogenation may be effected at any desired pressure. However, the partial pressure of the hydrocarbon reactant in the reaction zone is preferably not more than about one atmosphere. The low pressure of the reactant may be obtained by operating under diminishing pressure or by the use of a diluent while operating at normal pressure or at superatmospheric pressure. Steam is a particularly good diluent in most cases and is preferably employed in large amounts, for example, between 2 and 30 mols of steam per mol of hydrocarbon feed. Contact time is adjusted by the rate of flow to afford the desired degree of conversion. In general, flow rates of reactant corresponding to gaseous hourly space velocities (measured at standard conditions) between about 300 and 3000 may be employed.

The superiority of the catalyst of the invention is readily apparent from a consideration of the following example which is not to be construed, however, as limiting the invention except as it is limited in the appended claims.

*Example*

Three catalysts were prepared containing pigment grade alpha-iron oxide ($Fe_2O_3$) as the active catalytic ingredient, potassium carbonate ($K_2CO_3$) as a promoter, chromic oxide ($Cr_2O_3$) as a stabilizer and Portland cement as a binder. Small amounts of potassium chloride (KCl) were added to two of these compositions. A fourth catalyst was prepared by substituting potassium chloride for the potassium carbonate promoter so that this was the only potassium compound present in the catalyst formulation. All of the solids were finely divided prior to mixing and sufficient water was added to render an extrudable plastic mass. This mass was then extruded into 1/8-in. diameter extrusions except in the case of Catalyst No. 4 which was formed into 1/16-in. diameter extrusions. These extrusions were dried for a short interval, were broken into short lengths and were calcined in air at 600° F. for 12 hours. The composition of the finished catalysts in weight percent is given below.

|  | Catalyst 1 | Catalyst 2 | Catalyst 3 | Catalyst 4 |
| --- | --- | --- | --- | --- |
| $Fe_2O_3$ | 51.2 | 51.1 | 50.1 | 51.2 |
| $K_2CO_3$ | 26.3 | 26.2 | 25.8 |  |
| $Cr_2O_3$ | 2.5 | 2.5 | 2.4 | 2.5 |
| Cement | 20.0 | 20.0 | 19.6 | 20.0 |
| KCl |  | 0.2 | 2.1 | 26.3 |

A series of tests was conducted utilizing the prepared catalysts. The selectivities of all of the catalysts were determined in a differential reactor consisting of a 20-mm. O.D. quartz tube shielded by a stainless steel jacket and heated by means of a tube furnace. The catalyst pellets of known weight (1–10 g.) were placed in a quartz boat about 100 mm. x 15 mm. disposed within the reactor, a 60-mesh stainless steel screen being used to support the samples. Catalyst beds were only one or two pellets in depth in order to eliminate apparent differences in catalyst activity caused by the limited rate of diffusion of gases through the bed.

The reactor was heated and steam was passed through it overnight to remove air from the system. Ethylbenzene (99.5 to 99.7% purity) with steam in a weight ratio of steam to ethylbenzene of 2.2 to 1 was passed through the reactor at a rate of 30 g. per hour, a pressure of one atmosphere and at a temperature in the range of about 600° C. over a reaction period of 8 hours. Temperatures were recorded by means of thermocouples located within the reactor.

The effluent gas passed from the reactor into a water-cooled condenser and the condensate was collected in a receiving flask. Non-condensible gas was passed through a wet-test meter and vented after measurement. Samples of the organic condensate were analyzed for styrene, benzene, and toluene with precautions being taken to prevent any loss of benzene and toluene from the sample. Low levels of conversion to styrene (1–8%) were maintained throughout the experiment in order to remain in the differential range and to assure that any effects would be only those attributable to the catalyst. Selectivity of each catalyst tested for styrene and toluene is recorded in Table I. Selectivity is defined as follows:

$$\text{Selectivity} = \frac{\text{Styrene (or Toluene)}}{\text{Styrene} + \text{Benzene} + \text{Toluene}} \times 100$$

All selectivity data given are for the catalytic reaction only, corrections based on experimental determination having been made for any thermal reaction occurring.

TABLE I

| Catalyst No. | Selectivity | |
|---|---|---|
| | To Styrene (Mol Percent) | To Toluene (Mol Percent) |
| 1 | 95.7 | 2.9 |
| 2 | 97.7 | 2.1 |
| 3 | 98.7 | 1.1 |
| 4 | Nil | Nil |

It is evident from these data that potassium chloride present only in very minor amounts significantly improves the selectivity of a standard dehydrogenation catalyst which is here represented by Catalyst No. 1. The data also establish that this effect can in no way be attributed to the added potassium compound merely functioning as a promoter since it is evident from the results obtained with Catalyst No. 4 that this compound is entirely ineffective when employed as the promoter in the catalyst formulation.

In addition to its utility in the dehydrogenation of ethylbenzene to styrene, the catalyst of the invention is applicable for dehydrogenation of various other aromatic hydrocarbons having an alkyl side chain of at least two carbon atoms such as, for example, propylbenzene, diethylbenzene, ethyltoluene, propyltoluene, ethylnaphthalene, diethylnaphthalene, diethyl diphenyl, and the like. Likewise, the catalysts of the invention are suitable for use in the production of diolefins by dehydrogenation of mono-olefins having at least four non-quaternary carbon atoms in a straight chain. They are particularly useful, for example, in the production of butadiene from butylene and are also applicable and advantageous for the production of other diolefins and particularly conjugated diolefins such as piperylene, isoprene, the various hexadienes, and the like from the corresponding mono-olefins.

What is claimed is:

1. A process for the dehydrogenation of alkyl aromatic hydrocarbons which comprises contacting an alkyl aromatic hydrocarbon and steam under dehydrogenation conditions with a catalyst comprising iron oxide as the active catalytic agent, an alkali promotor which is a compound other than the chloride of a metal chosen from the group consisting of the alkali metals and the alkaline earth metals, and a minor amount of chemically combined chlorine.

2. A process for the dehydrogenation of alkyl aromatic hydrocarbons which comprises contacting an alkyl aromatic hydrocarbon and steam under dehydrogenation conditions with a catalyst comprising iron oxide as the active catalytic agent, an alkali promoter which is a compound other than the chloride of a metal chosen from the group consisting of the alkali metals and the alkaline earth metals, and a minor amount of the chloride of the metal of said alkali promoter.

3. A process for the dehydrogenation of ethylbenzene which comprises contacting ethylbenzene and steam under dehydrogenation conditions with a catalyst comprising iron oxide as the active catalytic agent, an alkali promoter which is a compound of an alkali metal other than the chloride, and a minor amount of an alkali metal chloride.

4. A process for the dehydrogenation of ethylbenzene which comprises contacting ethylbenzene and steam under dehydrogenation conditions with a catalyst comprising iron oxide as the active catalytic agent, a compound of postassium other than the chloride as a promoter, chromium oxide as a stabilizer, and a minor amount of potassium chloride.

5. The process of claim 4 wherein said catalyst contains at least 35% by weight of iron oxide, from about 5% to about 35% of said potassium promoter, from about 1% to about 5% of chromic oxide, and a sufficient amount of potassium chloride to provide from about 0.05% to about 2.5% of chlorine in said catalyst composition.

6. The process of claim 4 wherein said catalyst contains 50.1% iron oxide, 25.8% potassium carbonate, 2.4% chromic oxide, and 2.1% potassium chloride.

7. The process of claim 4 wherein said catalyst contains 51.1% iron oxide, 26.2% potassium carbonate, 2.5% chromic oxide, and 0.2% potassium chloride.

References Cited by the Examiner
UNITED STATES PATENTS

| | | | |
|---|---|---|---|
| 2,542,464 | 2/1951 | Black et al. | 252—441 X |
| 2,866,791 | 12/1958 | Pitzer | 260—669 X |
| 2,971,926 | 2/1961 | Stillwell | 252—441 |
| 3,179,707 | 4/1965 | Lee | 260—669 |

DELBERT E. GANTZ, *Primary Examiner.*

C. R. DAVIS, *Assistant Examiner.*